(12) United States Patent
Erlacher et al.

(10) Patent No.: US 10,689,897 B2
(45) Date of Patent: Jun. 23, 2020

(54) PASSENGER TRANSPORT VEHICLE

(71) Applicant: MAGNA STEYR Fahrzeugtechnik AG & Co KG, Graz (AT)

(72) Inventors: Manuel Erlacher, Radenthein (AT); Gerhard Krachler, Großpesendorf (AT); Martin Rodler, Krottendorf (AT); Walter Rosinger, Graz (AT)

(73) Assignee: MAGNA STEYR Fahrzeugtechnik AG & Co KG, Graz (AT)

( * ) Notice: Subject to any disclaimer, the term of this patent is extended or adjusted under 35 U.S.C. 154(b) by 0 days.

(21) Appl. No.: 16/163,615

(22) Filed: Oct. 18, 2018

(65) Prior Publication Data
US 2019/0119970 A1  Apr. 25, 2019

(30) Foreign Application Priority Data
Oct. 20, 2017 (EP) ...................... 17197556

(51) Int. Cl.
*E05F 15/73* (2015.01)
*B60Q 5/00* (2006.01)
*B60Q 1/50* (2006.01)
*G06K 9/00* (2006.01)
(Continued)

(52) U.S. Cl.
CPC ............. *E05F 15/73* (2015.01); *B60Q 1/50* (2013.01); *B60Q 5/005* (2013.01); *B61L 15/0072* (2013.01); *G06K 9/00369* (2013.01); *G06K 9/00771* (2013.01); *G06K 9/00832* (2013.01); *G07C 9/00* (2013.01);
(Continued)

(58) Field of Classification Search
CPC ..... E05F 15/73; E05F 2015/767; E05F 15/75; E05F 15/70; E05F 2015/765; B61L 15/0072; G07C 9/00; G07C 9/00166; G06K 9/00771; G06K 9/00832; G06K 9/00369; B60Q 1/50; B60Q 5/005; E05Y 2400/812; E05Y 2400/82; E05Y 2900/531
USPC ........................................................ 701/49
See application file for complete search history.

(56) References Cited

U.S. PATENT DOCUMENTS 6,919,804 B1  7/2005  Cook et al.
7,188,760 B1  3/2007  Preston
(Continued)

FOREIGN PATENT DOCUMENTS

| CN | 202101742 U | 1/2012 |
| CN | 202422208 U | 9/2012 |
| CN | 202557404 U | 11/2012 |

(Continued)

OTHER PUBLICATIONS

Chinese Office Action for China Patent Application No. 201811213722, dated Jan. 15, 2020, 9 pages.

*Primary Examiner* — Muhammad Shafi
(74) *Attorney, Agent, or Firm* — Jordan IP Law, LLC; Todd A. Vaughn

(57) ABSTRACT

A passenger transport vehicle that includes at least one door, an optical detection module to dynamically detect a current fill value representing a number of occupants in the passenger transport vehicle, and a control module operatively connected to the at least one door and the optical detection module. The control module is configured to automatically initiate a closing sequence that includes movement of the door to a closed position once the detected current fill value reaches a predetermined threshold fill value for the passenger transport vehicle.

16 Claims, 5 Drawing Sheets

(51) Int. Cl.
*G07C 9/00* (2020.01)
*B61L 15/00* (2006.01)
(52) U.S. Cl.
CPC ... *E05F 2015/765* (2015.01); *E05Y 2400/812* (2013.01); *E05Y 2400/82* (2013.01); *E05Y 2900/531* (2013.01)

(56) References Cited

U.S. PATENT DOCUMENTS

2006/0208169 A1* 9/2006 Breed ................. B60N 2/002
250/221
2018/0164809 A1* 6/2018 Moosaei ............. G05D 1/0022

FOREIGN PATENT DOCUMENTS

| | | | |
|---|---|---|---|
| CN | 202929714 | * | 5/2013 |
| CN | 202929714 U | | 5/2013 |
| CN | 104021187 | * | 6/2014 |
| CN | 104290686 A | | 1/2015 |
| CN | 205158625 U | | 4/2016 |
| CN | 205158627 U | | 4/2016 |
| CN | 205692379 U | | 11/2016 |
| CN | 106373428 A | | 2/2017 |
| EP | 1100050 A1 | | 5/2011 |
| EP | 2801956 A1 | | 11/2014 |
| JP | S6394390 A | | 4/1988 |
| JP | 2012101626 A | | 5/2012 |
| JP | 2012121484 A | | 6/2012 |

* cited by examiner

PASSENGER TRANSPORT VEHICLE

CROSS-REFERENCE TO RELATED APPLICATIONS

The present application claims priority 35 U.S.C. § 119 to European Patent Publication No. EP 17197556.8 (filed on Oct. 20, 2017), which is hereby incorporated by reference in its entirety.

TECHNICAL FIELD

Embodiments relate to a passenger transport vehicle and to a method for operating a passenger transport vehicle of this kind.

BACKGROUND

Passenger transport vehicles, such as in particular buses and trains, coaches, apron buses and the like, are sufficiently well known per se. Usually, they afford more than four spaces, for the most part even more than eight spaces for passengers who may be brought to their destination by means of the passenger transport vehicle. The passenger transport vehicles are usually designed for a specific maximum number of passengers or a maximum permissible total weight.

For boarding and unboarding of passengers, such vehicles usually have doors, for example, electrically, pneumatically or hydraulically operated doors, which may often be operated fully automatically or semi-automatically. For example, the doors may be opened at the push of a button by passengers inside and outside the passenger transport vehicle. Depending on the purpose of use and the configuration of the specific vehicle, the doors may, for example, also be opened or closed at the push of a button by the bus driver, or it is possible for the passengers to push a signal transmitter, for example, pushbuttons arranged in the vehicle at multiple positions and/or outside on the doors, to lodge a request to open the door, which may then be put into effect by the vehicle automatically and/or by the driver after the vehicle has come to a standstill.

Optical systems for sensing occupants/passengers that may identify particular occupants/passengers via video monitoring and face recognition are also known, for example, from WO 2012/130808 A1.

On the other hand, there are also devices that, for example, using cameras and/or laser sensors, may detect the presence of occupants/passengers, regardless of their identity, and also the direction of movement of the occupants/passengers, in particular, in the entrance region of buildings. Such devices permit the presence of any occupants/passengers to be detected or else occupants/passengers to be counted and their direction of movement to be ascertained.

SUMMARY

Embodiments relate to the observance of threshold/maximum fill values, such as, for example, a maximum number of occupants/passengers or the maximum permissible total weight.

Embodiments relate to a passenger transport vehicle that facilitates simple observance of a threshold/maximum fill value, in particular, the threshold/maximum number of vehicle occupants/passengers for the passenger transport vehicle or a threshold/maximum weight, and a corresponding method of observing the threshold/maximum fill value for the passenger transport vehicle.

In accordance with embodiments, a passenger transport vehicle may comprise a vehicle body having at least one door; a control module to close the door; and an optical detection module, operatively connected to the control module, to detect a current fill value of occupants/passengers in the passenger transport vehicle, wherein when the at least one door is in an open position and the detected current fill value is at least one predetermined maximum fill value, the control module sends a control signal to initiate a closing sequence for the door (e.g., movement of the door to a closed position).

In accordance with embodiments, a passenger transport vehicle, such as, for example, a passenger bus, comprises a vehicle body having a door with a control module associated therewith. The control module is configured to receive at least fundamental data or otherwise a detected current fill value from a corresponding detection module, so that the control module is to initiate a closing sequence for the door when the maximum fill value is exceeded.

In accordance with embodiments, autonomously driven passenger transport vehicles and motor vehicles have a disadvantage in that its respective maximum permissible number of occupants/passengers or the maximum permissible total weight cannot be policed by personnel who are travelling at the time. For vehicles of this kind, observance of a maximum number of occupants/passengers, and/or a maximum permissible total weight, and the like (e.g., similar fill variables for the vehicle) may be achieved via a passenger transport vehicle comprising a suitable detection module to detect the current occupancy threshold and a corresponding a control module.

In accordance with embodiments, the closing sequence for the door may preferably comprise, before the actual closing of the door, the output of an audible and/or visual warning signal.

In accordance with embodiments, the closing sequence for the door may comprise, before the actual closing of the door, activation of an entry restriction, in particular, activation or closing of a barrier or beam. In this manner, entry into the passenger transport vehicle is prevented or impeded and imminent closing of the door is articulated/announced before the door is actually closed.

In accordance with embodiments, the closing sequence for the door comprises an assessment of one or more closing prerequisites, so that the door is actually closed only upon reaching predetermined positive values predetermined by the closing prerequisites. For example, closing prerequisites of this kind may be that there is nobody in a more accurately predetermined hazard region of the door, or that certain special predetermined conditions (e.g., an emergency status) exist or do not exist.

In accordance with embodiments, the fill value indicates the number of occupants/passengers currently in the passenger transport vehicle, and the maximum fill value indicates a maximum number of occupants/passengers that the passenger transport vehicle may transport.

In accordance with embodiments, the detection module to detect the fill value for the passenger transport vehicle may comprises one or more sensing devices to sense individual occupants/passengers boarding the vehicle and individual occupants/passengers unboarding (e.g., in the region of the door). The detection module to detect the fill value or the control module may ascertain the number of occupants/passengers currently in the passenger transport vehicle therefrom.

In accordance with embodiments, the passenger transport vehicle therefore may comprise at least one door, one or more sensing devices to sense/detect individual occupants/passengers boarding the vehicle and individual occupants/passengers unboarding the vehicle; and a control module configured to (1) receive a signal transmitted by the one or more sensing devices that represents the number of individual occupants/passengers boarding the vehicle and individual occupants/passengers unboarding the vehicle, (2) dynamically calculate the overall total number of occupants/passengers in the vehicle, and (3) based on the calculation, initiate a closing sequence for the door when the door is in an open position and the calculated number of occupants/passengers in the passenger transport vehicle reaches at least one predetermined maximum/threshold value.

In accordance with embodiments, the passenger transport vehicle is provided with one or more sensing devices to sense/detect individual occupants/passengers boarding the vehicle and individual occupants/passengers unboarding the vehicle. The sensing/detection of individual occupants/passengers is intended to be understood in this context to mean the detecting of the presence of a occupant/passenger, the identity of the person is thus not required to be determined or evaluated. Instead, just the event of the occupant/passenger who is present and a determination of the status (e.g., "boarding" or "unboarding") is ascertained. The status as boarding" or "unboarding may be determined on the basis of the direction of movement of the occupant/passenger. The event of the boarding or unboarding as such is recorded and reported to the control module.

In accordance with embodiments, from these notifications, the control module and/or the detection module, may dynamically calculate the overall total number of occupants/passengers in the vehicle by adding the detected "boarding" occupants/passengers and subtracting the detected "unboarding" occupants/passengers.

In accordance with embodiments, if the calculated overall total number of occupants/passengers in the passenger transport vehicle reaches a predetermined threshold/maximum value for the passenger transport vehicle, which may be prescribed by the licensing of the passenger transport vehicle, a closing sequence for the door is initiated in order to prevent or impede the boarding of additional occupants/passengers.

In accordance with embodiments, the threshold/maximum value of occupants/passengers may be exceeded when a predetermined permissible threshold/maximum weight has not yet been reached and/or free spaces, in particular, seats, are still detected and/or free interior space is detected.

In accordance with embodiments, the threshold/maximum value of occupants/passengers permissible for a vehicle does not have to be fixed for the longer term, but rather, may be dynamically matched to the present/current circumstances. For example, it is possible to detect the physical stature (e.g., whether tall, short, thin or corpulent) of occupants/passengers boarding the vehicle. On the basis of dynamic measurements and calculations, or using data records stored in memory of the control module, it is then possible for the control module to define a threshold/maximum number of occupants/passengers, and therefore restrict how many occupants/passengers may still board. Alternatively or additionally, in buses with standing areas, it is possible for the density of occupants/passengers staying in the vehicle or the free spaces remaining between the occupants/passengers to be sensed/detected, so that the control module may take this as a basis for defining the threshold/maximum number of occupants/passengers and thus deciding whether an actually threshold/maximum number of occupants/passengers has been reached or whether occupants/passengers may still board the vehicle. In this manner, an optimum extent of filling for the internal space may be achieved. In this case, however, further entry may no longer be possible when a permissible threshold/maximum weight is reached.

In accordance with embodiments, the control module and/or the detection module may thus be configured to dynamically change the predetermined threshold/maximum number of occupants/passengers during operation of the passenger transport vehicle, in particular, on the basis of free spaces detected in the passenger transport vehicle.

Alternatively or additionally, occupant/passenger detection or facial recognition may also be performed by the control module, which may be operated to establish whether occupants/passengers actually board and/or unboard, in order not to exceed the threshold/maximum number of occupants/passengers.

In accordance with embodiments, the fill value may also indicate a current fill weight, and the threshold/maximum fill value may be a permissible maximum weight.

In accordance with embodiments, the detection module to detect the fill value for the passenger transport vehicle may comprise one or more sensing devices to sense/determine the fill weight, and the detection module and/or the control module is to calculate the current fill weight therefrom.

In accordance with embodiments, the passenger transport vehicle may comprise one or more sensing devices to determine a vehicle weight, are arranged in the region of a chassis of the vehicle and/or floor of the vehicle. The control module is configured so that the determined weight influences the initiation of the closing sequence of the door.

In accordance with embodiments, the "vehicle weight" may, for example, be a total overall weight of the passenger transport vehicle or a weight/force acting on the vehicle floor. If the determined weight exceeds a permissible threshold/maximum weight value, the closing sequence for the door may be initiated. For example, this may be used so that, if the vehicle is loaded with particularly heavy loads such as suitcases, etc., the closing sequence for the door is initiated even though the maximum number of occupants/passengers for the vehicle has not yet been reached. Conversely, it is also possible not actually not initiate closing of the door when the maximum number of occupants/passengers is exceeded should the calculated weight be below a permissible threshold/maximum weight. A comparison of the weight measured by the sensing devices with a threshold/maximum weight may thus be a closing prerequisite, as described above.

In accordance with embodiments, the fill value may also be a combination of the number of occupants/passengers currently in the passenger transport vehicle and the current fill weight, for example, which means that the door may be closed, for example, when both a specific predetermined threshold/maximum number of occupants/passengers and a specific predetermined threshold/maximum weight are exceeded.

In accordance with embodiments, the passenger transport vehicle may include a display to display the fill value and/or the difference between maximum fill value and the current fill value, i.e., the number of occupants/passengers in the vehicle and/or the difference between the maximum number of occupants/passengers and the current occupants/passengers in the vehicle, and thus, the number of free spaces in the vehicle. The display is arranged so as to be visible from outside of the vehicle, such as, for example, a region adjacent to door. The number of free spaces does not have to be limited to seats in this case, but may also include standing spaces, places to lie, etc.

In accordance with embodiments, the passenger transport vehicle may be configured for autonomous driving, i.e., for operation without a human driver. Specifically, in such an autonomous passenger transport vehicle, automatic and strict adherence/observance of a threshold/maximum permissible number of occupants/passengers and/or a threshold/maximum permissible total weight is invaluable.

In accordance with embodiments, a method for operating a passenger transport vehicle may comprise: calculating/detected a current fill value of the passenger transport vehicle using the detection module, and initiating a closing sequence of a door (e.g., via a control module), when the door is open and the calculated/detected fill value reaches at least a predetermined threshold/maximum fill value.

In accordance with embodiments, a method for operating a passenger transport vehicle may comprise: dynamically detecting individual boarding occupants/passengers and individual unboarding occupants/passengers in a region of the door; dynamically transmitting (e.g., to a control module) a signal representing the value of detected individual boarding occupants/passengers and individual unboarding occupants/passengers; and are transmitted; dynamically calculating (e.g., via the control module) the current number of occupants/passengers in the passenger transport vehicle; dynamically determining (e.g., via the control module) the status of the door (e.g., open or closed) and whether the current number of occupants/passengers in the passenger transport vehicle reaches at least one predetermined threshold/maximum number of occupants/passengers; and initiating a closing sequence of a door that the control module initiates a closing sequence of the door when the door is detected to be open and the calculated/detected fill value reaches the predetermined threshold/maximum fill value.

In accordance with embodiments, the features specified for the passenger transport vehicle may naturally also be features of a method, and vice versa.

Embodiments relate to a passenger transport vehicle that facilitates or enables simple observance of a threshold/maximum fill value for the passenger transport vehicle, and particularly, a threshold/maximum number of occupants/passengers and/or a permissible threshold/maximum weight of the vehicle or the load area thereof.

DRAWINGS

Embodiments will be illustrated by way of example in the drawings and explained in the description below.

DESCRIPTION

Figure 1:
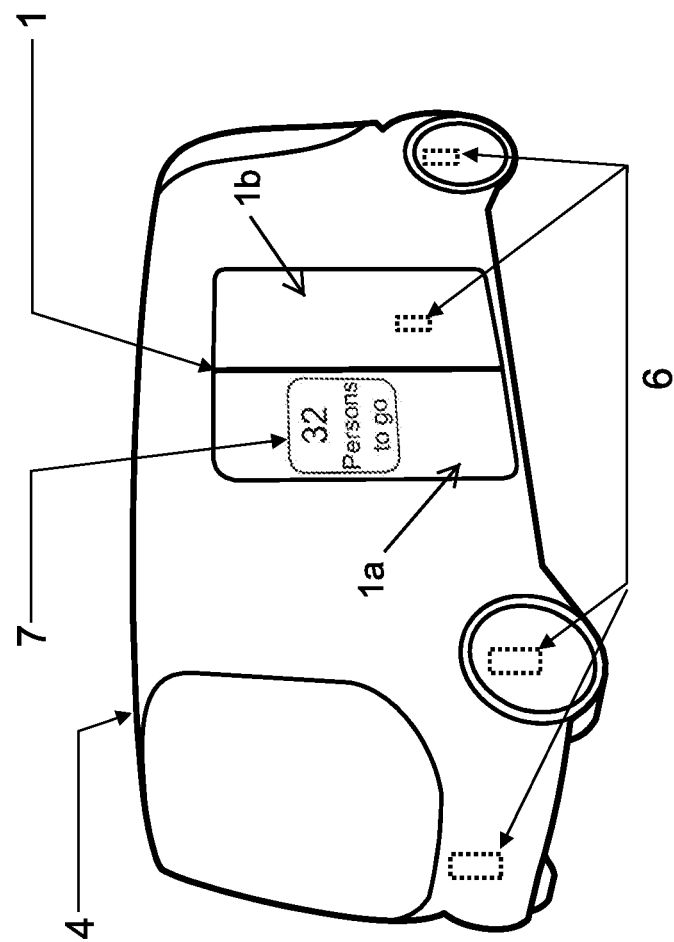
FIG. 1 illustrates a schematic three-dimensional view of a passenger transport vehicle in a first operating state, in accordance with embodiments.
Figure 2:
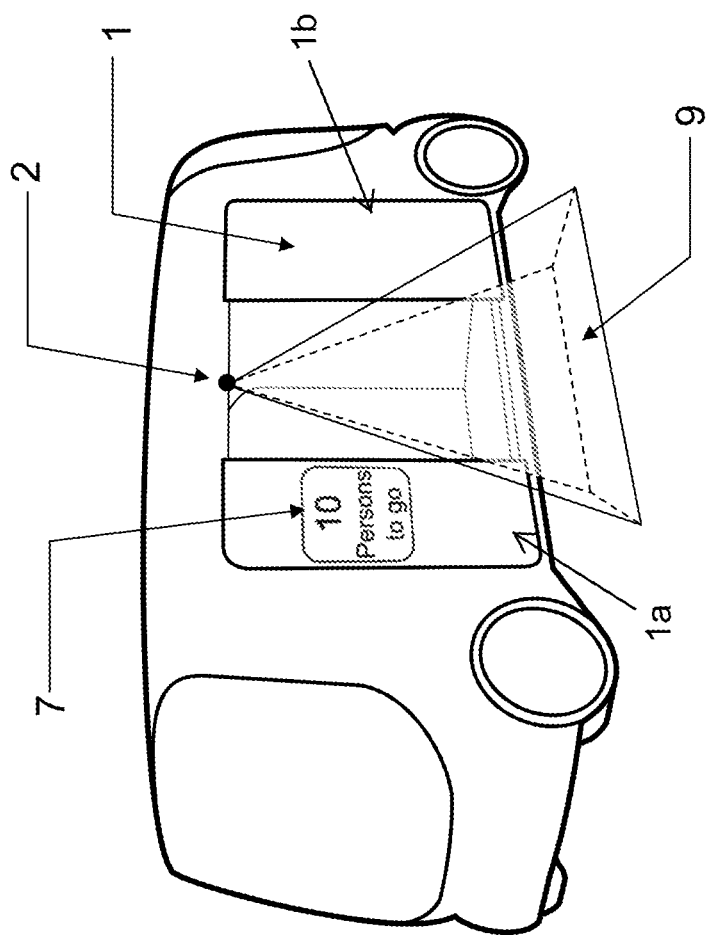
FIG. 2 illustrates a schematic three-dimensional view of the passenger transport vehicle of FIG. 1, in a second operating state.
Figure 3:
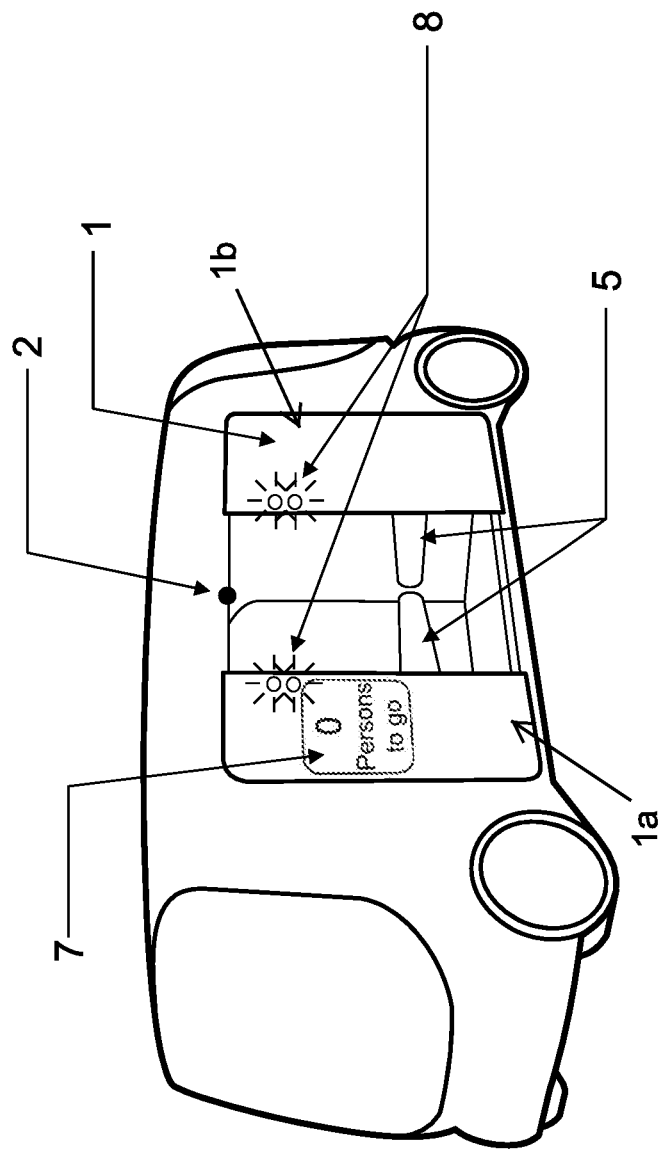
FIG. 3 illustrates a schematic three-dimensional view of the passenger transport vehicle of FIG. 1, in a third operating state.

As illustrated in FIGS. 1 to 3, a passenger transport vehicle 4 such as, for example, a bus, comprising a door 1 configured as a winged door having a left door wing 1a and a right door wing 1b, and allowing people, i.e., occupants/passengers of the passenger transport vehicle 4, to board and unboard. In FIG. 1, the passenger transport vehicle 4 is depicted in a first operating state in which the door 1 is in a closed position. Whereas in FIGS. 2 and 3, the passenger transport vehicle 4 is depicted in a second operating state in which the door 1 is in an open position.

The door 1 has a display 7 arranged thereon (or adjacent thereto), so that display content thereof is visible outside of the passenger transport vehicle 4. Such people may include for example, occupants/passengers who desire boarding the vehicle 4. The display 4 may display, for example, a value (e.g., a numeric symbol) indicating how many occupants/passengers may board the vehicle. This value may be dynamically derived by subtracting a current number of detected, calculated, or sensed occupants/passengers in the passenger transport vehicle 4 from a maximum number of a maximum number of occupants/passengers the vehicle 4 is to transport.

As illustrated in FIGS. 1 through 5, the passenger transport vehicle 4 includes a first detection module 15 that includes a plurality of sensing devices 6 configured to dynamically sense/detect/determine a current vehicle weight. The sensing devices 6 may be arranged on the passenger transport vehicle 4 in a region of a chassis of the passenger transport vehicle 4.

The passenger transport vehicle 4 also includes a second detection module 11 that includes one or more optical sensing devices 2. The optical sensing device(s) 2 may comprise, for example, a camera or image sensor a sensor to dynamically sense/detect/determine individual occupants/passengers that are boarding the passenger transport vehicle 4 and also individual occupants/passengers that are unboarding the passenger transport vehicle 4. The optical sensing device(s) 2 may be arranged on the passenger transport vehicle 4 adjacent to the door 1 so as to dynamically monitor a detection region 9. Here, the detection region 9 is a region where occupants/passengers are to board/unboard the passenger transport vehicle 4. The second detection module 11 may also include an image evaluation unit 10 that is operatively connected to the optical sensing device(s) 2.

Figure 4:
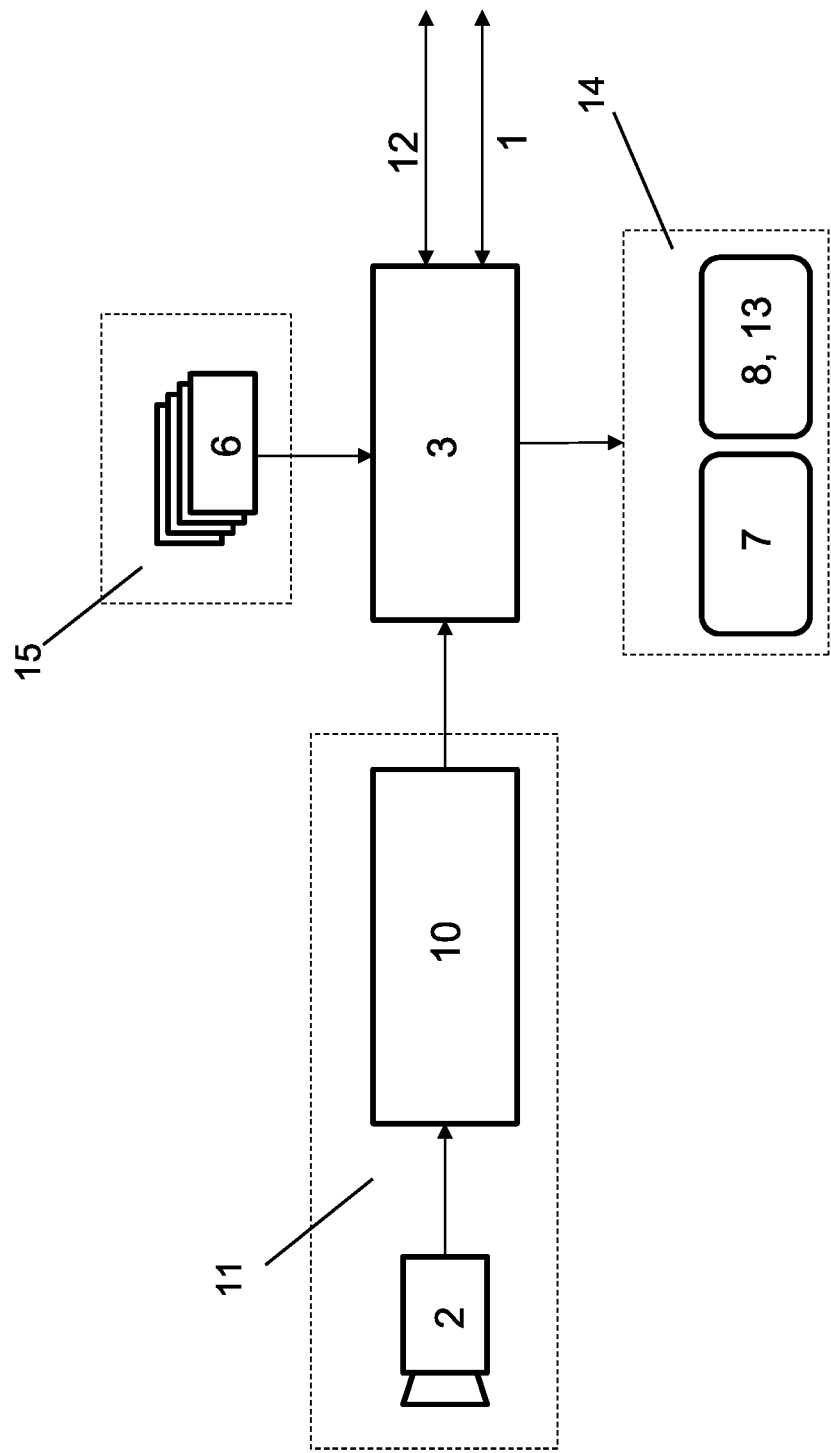
FIG. 4 illustrates a schematic depiction of control module architecture for the passenger transport vehicle of FIG. 1.
Figure 5:
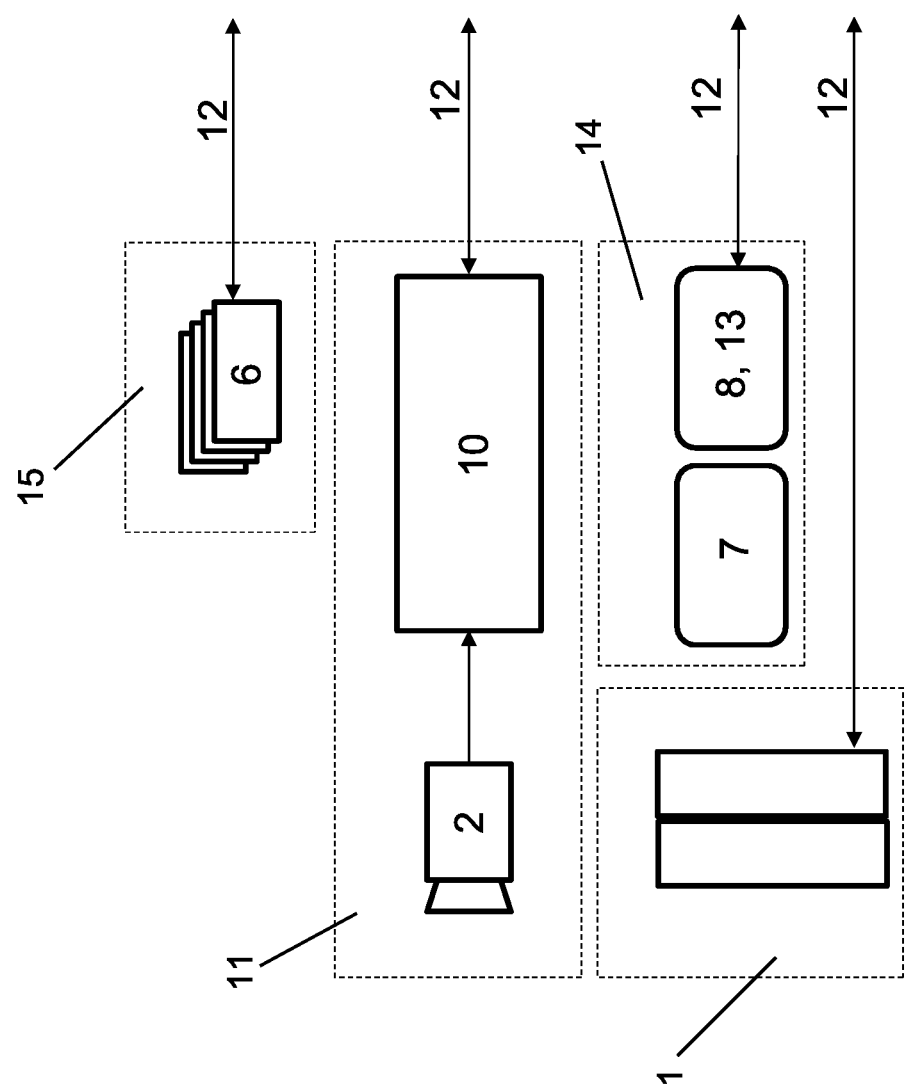
FIG. 5 illustrates a schematic depiction of an operational link between the control module architecture of FIG. 4 to a vehicle bus of the passenger transport vehicle of FIG. 1.

As illustrated in FIGS. 4 and 5, the passenger transport vehicle 4 includes a control module 3 operatively connected to the first detection module 15 and the second detection module 11.

The control module 3 may include inputs from the sensing devices 6 for determining the vehicle weight. The control module 3 may be configured to dynamically receive a transmitted signal from the first detection module 15 representing the current vehicle weight data, and thereby control the operating state of the door 1. In particular, the control module 3 may be configured to compare the sensed/detected/determined current vehicle weight to a permissible threshold/maximum weight of the passenger transport vehicle 4. Should the sensed/detected/determined current vehicle weight be at or exceed the permissible threshold/maximum weight, the control module 3 may then initiate a closing sequence of the door 1. Should the sensed/detected/determined current vehicle weight be below the predetermined permissible threshold/maximum weight, the control module 3 may then keep the door 1 in an open state.

The results from the image evaluation unit 10, in particular, of individual detected occupants/passengers or the current total number thereof, may be transmitted to the control module 3. In particular, the control module 3 may be configured to dynamically receive a transmitted signal from the second detection module 11 representing data of the individual occupants/passengers that are boarding the passenger transport vehicle 4 and also data of the sensed/detected/determined individual occupants/passengers that are unboarding the passenger transport vehicle 4. The control module 3 may then, based on this data, calculate the overall number of occupants/passengers in the passenger transport vehicle 4. The control module 3 may be configured to dynamically compare the calculated overall number of occupants/passengers to a predetermined threshold/maximum permissible number of occupants/passengers. The control unit 3 is also configured to initiate a closing sequence for the door 1 when the door 1 is in an open position and the current number of people in the passenger transport vehicle 4 is at predetermined threshold/maximum permissible number of occupants/passengers.

The closing sequence may also include, prior to closing the door 1, the control module 3 sending a signal to a visual/audible (A/V) signal transmitter module 14 which is to thereby output an audible signal via loudspeakers 13 and/or a visual warning signal via warning lamps 8 (See, FIG. 3). The closing sequence may also include activation of an entry restriction(s) 5 before the actual closing of the door 1 that physically prevent entry into the passenger transport vehicle 4. The entry restriction(s) 5 may comprise one or more lateral beams that are moveable between an open position permitting entry and a second position preventing or impeding entry.

As illustrated in FIG. 4, hardware architecture of a system for the a passenger transport vehicle 4 that includes the control module 3, the first detection module 15, the second detection module 11, and the A/V signal transmitter module 14, in accordance with embodiments.

The control module 3 may comprise a microcontroller having a processor and memory operatively connected to the processor. The memory may store instructions in the firm of a control program which, when executed by the processor, cause the processor to: (i) compare a sensed/detected/determined current vehicle weight to a permissible threshold/maximum weight of the passenger transport vehicle 4; (ii) initiate a closing sequence of the door 1 should the sensed/detected/determined current vehicle weight be at or exceed the permissible threshold/maximum weight, or (iii) keep the door 1 in an open state should the sensed/detected/determined current vehicle weight be below the predetermined permissible threshold/maximum weight.

The processor of the control module 3 may also be caused to: (i) dynamically calculate the overall number of occupants/passengers in the passenger transport vehicle 4, (ii) dynamically compare the calculated overall number of occupants/passengers to a predetermined threshold/maximum permissible number of occupants/passengers, (iii) initiate a closing sequence for the door 1 should the current number of people in the passenger transport vehicle 4 is at or exceeds the predetermined threshold/maximum permissible number of occupants/passengers, or (iv) keep the door 1 in an open state should the calculated current number of people in the passenger transport vehicle 4 be below the predetermined threshold/maximum permissible number of occupants/passengers.

The control module 3 may also be configured in a manner distributed over multiple microcontrollers and/or multiple control programs and/or multiple controllers. By way of example, the functionality of the summation of the number of boarding and unboarding of occupants/passengers on a controller may be designed such that it may be operatively associated with the optical sensing device(s) 2.

In accordance with embodiments, a bidirectional connection between the control module 3 and the door 1 facilitates detection of the state of the door 1, and the opening and closing of the door 1 by the control module 3. There is a further bidirectional connection to a vehicle databus 12, such as, for example, a CAN bus, of the vehicle 4.

In accordance with embodiments, the A/V signal transmitter module 14, in particular, the optical display 7, and warning lamps 8 and/or loudspeakers 13, may be controlled by the control module 3.

As illustrated in FIG. 5, a link from the hardware components of the control module 3 to the vehicle bus 12 of the passenger transport vehicle 4 may also comprise additional direct connections. In particular, the weight sensors 6 for determining a vehicle weight, which may be integrated into the control module 3 or a second control module, the optical detection module 11, the door 1 (which itself may comprise a separate control module), and/or the A/V signal transmitter module 14 may be linked to the vehicle bus 12 directly.

The terms "coupled," "attached," or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological signifimayce unless otherwise indicated.

Those skilled in the art will appreciate from the foregoing description that the broad techniques of the embodiments may be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

LIST OF REFERENCE SYMBOLS

1 Door
2 Optical sensing device(s)
3 Control module
4 Passenger transport vehicle
5 Entry restriction
6 Weight sensing devices for determining a vehicle weight
7 Optical display
8 Warning lamp(s)
9 Detection region
10 Image evaluation unit
11 Optical detection module
12 Vehicle bus
13 Audio speaker
14 A/V signal transmitter module

What is claimed is:

1. A passenger transport vehicle, comprising:
at least one door;
an optical detection module to dynamically detect a current fill value representing a number of occupants in the passenger transport vehicle; and
a control module operatively connected to the at least one door and the optical detection module, the control module being configured to automatically initiate a closing sequence that includes movement of the door to a closed position once the detected current fill value reaches a predetermined threshold fill value for the passenger transport vehicle,
wherein the control module or the optical detection module is configured to dynamically modify the predetermined threshold fill value during operation of the passenger transport vehicle based on a detected of available spaces in the passenger transport vehicle.

2. The passenger transport vehicle of claim 1, further comprising an audio/visual signal transmitter module operatively connected to the control module.

3. The passenger transport vehicle of claim 2, wherein the closing sequence comprises output of an audible and/or a visual warning signal by the audio/visual signal transmitter module before movement of the door to the closed position.

4. The passenger transport vehicle of claim 2, wherein the audio/visual signal transmitter module includes a display arranged on the passenger transport vehicle and configured to optically display the current fill value from outside the passenger transport vehicle.

5. The passenger transport vehicle of claim 1, wherein the closing sequence comprises an evaluation of on one or more closing criteria, so that the door is actually closed only if predetermined positive values for the closing criteria are met.

6. The passenger transport vehicle of claim 1, wherein the closing sequence comprises activation of an entry barrier to prevent or impede entry into the passenger transport vehicle before the actual closing of the door.

7. The passenger transport vehicle of claim 1, wherein the optical detection module comprises one or more optical sensing devices configured to dynamically detect individual passengers that are boarding and unboarding the passenger transport vehicle.

8. The passenger transport vehicle of claim 7, wherein the control module or the optical detection module is configured to dynamically calculate the current fill value based on the detected individual passengers that are boarding and unboarding the passenger transport vehicle.

9. The passenger transport vehicle of claim 1, further comprising a weight detection module to dynamically detect a current fill weight representing an overall weight of the passenger transport vehicle.

10. The passenger transport vehicle of claim 9, wherein the weight detection module comprises one or more weight sensing devices configured to dynamically detect the current fill weight.

11. The passenger transport vehicle of claim 10, wherein the control module or the optical detection module is configured to dynamically calculate the current overall fill weight based on the detected current fill weight.

12. The passenger transport vehicle of claim 10, wherein the one or more weight sensing devices are arranged in a region of a chassis of the passenger transport vehicle.

13. The passenger transport vehicle of claim 1, wherein the passenger transport vehicle comprises an autonomously driven passenger transport vehicle.

14. A passenger transport vehicle, comprising:
at least one door;
an optical detection module to dynamically detect individual passengers that are boarding and unboarding the passenger transport vehicle, and dynamically calculate a current fill value based on the detected individual passengers that are boarding and unboarding the passenger transport vehicle; and
a control module operatively connected to the optical detection module and the at least one door, the control module being configured to receive a signal from the optical detection module representing the calculated current fill value, compare the calculated current fill value with a predetermined threshold fill value for the passenger transport vehicle, and initiate a closing sequence that includes movement of the door to a closed position once the calculated current fill value reaches the predetermined threshold fill value,
wherein the control module or the optical detection module is configured to dynamically modify the predetermined threshold fill value during operation of the passenger transport vehicle based on a detected of available spaces in the passenger transport vehicle.

15. The passenger transport vehicle of claim 14, wherein the passenger transport vehicle comprises an autonomously driven passenger transport vehicle.

16. A method for operating a passenger transport vehicle, the method comprising:
dynamically detecting individual passengers that are boarding and unboarding the passenger transport vehicle;
dynamically calculating a current fill value based on the detected individual passengers that are boarding and unboarding the passenger transport vehicle;
comparing the calculated current fill value with a predetermined threshold fill value for the passenger transport vehicle;
initiating a closing sequence that includes movement of the door to a closed position once the calculated current fill value reaches the predetermined threshold fill value; and
dynamically modifying the predetermined threshold fill value during operation of the passenger transport vehicle based on a detected of available spaces in the passenger transport vehicle.

* * * * *